(12) United States Patent
Jacobson et al.

(10) Patent No.: US 8,751,624 B1
(45) Date of Patent: Jun. 10, 2014

(54) SYSTEM AND METHOD FOR IDENTIFYING ISSUES RELATED TO MESSAGES IN A COMMUNICATION NETWORK

(75) Inventors: Van Jacobson, Woodside, CA (US); Tina Wong, Pittsburgh, PA (US)

(73) Assignee: Packet Design, LLC, Santa Clara, CA (US)

( * ) Notice: Subject to any disclaimer, the term of this patent is extended or adjusted under 35 U.S.C. 154(b) by 2022 days.

(21) Appl. No.: 11/302,095

(22) Filed: Dec. 12, 2005

Related U.S. Application Data (60) Provisional application No. 60/635,213, filed on Dec. 10, 2004.

(51) Int. Cl.
*G06F 15/173* (2006.01)
*H04L 12/26* (2006.01)

(52) U.S. Cl.
CPC ............... *H04L 43/16* (2013.01); *H04L 43/06* (2013.01); *H04L 43/062* (2013.01)
USPC .......................................................... 709/224

(58) Field of Classification Search
CPC ........ H04L 43/06; H04L 43/062; H04L 43/16
USPC .......................................................... 709/224
See application file for complete search history.

(56) References Cited

U.S. PATENT DOCUMENTS

| 4,692,761 | A | * | 9/1987 | Robinton | 340/825.01 |
| 5,392,328 | A | * | 2/1995 | Schmidt et al. | 379/27.06 |
| 2003/0133417 | A1 | * | 7/2003 | Badt, Jr. | 370/254 |
| 2004/0006600 | A1 | * | 1/2004 | Miller et al. | 709/206 |
| 2005/0099958 | A1 | * | 5/2005 | Freedman | 370/252 |
| 2006/0168006 | A1 | * | 7/2006 | Shannon et al. | 709/206 |

* cited by examiner

*Primary Examiner* — Boris Gorney
(74) *Attorney, Agent, or Firm* — Hulsey P.C.; William N. Hulsey, III; Jacob S. Mattis (57) ABSTRACT

A system and method processes messages related to nodes in a network and provides reports according to those messages to allow analysis of the network.

15 Claims, 3 Drawing Sheets

SYSTEM AND METHOD FOR IDENTIFYING ISSUES RELATED TO MESSAGES IN A COMMUNICATION NETWORK

RELATED APPLICATION

This application claims the benefit of U.S. Provisional Patent Application Ser. No. 60/635,213, entitled, "Method and Apparatus for Identifying Issues Related to Messages in a Communication Network", filed by Van Jacobson and Tina Wong on Dec. 10, 2004, having the same assignee as the present application, and is hereby incorporated by reference herein in its entirety.

FIELD OF THE INVENTION

The present invention is related to computer software and more specifically to network analysis software.

BACKGROUND OF THE INVENTION

Networks such as the Internet are made up of autonomous systems, consisting of a network under control of an administrative entity. Messages such as BGP messages are received by routers that speak the BGP protocol and that allow the current state of the network of autonomous systems to be identified. Each BGP speaker in an autonomous system (AS) (the "home AS") provides to the other BGP speakers in that AS (I)BGP messages that each describes a link emanating from that BGP speaker to another AS (the link being defined by the IP addresses at each end of the link), an address or a block of several contiguous addresses specified by a prefix to which the message relates, and an indication that the message is announcing the existence of a route for that address or block of addresses that starts at the indicated link (an "announce message"), or an indication that the existence of such a route is being withdrawn (a "withdraw message"). Each (I)BGP message also includes as attributes an ordered list of nodes that describe the path to which the message corresponds. The nodes include a border router of the home AS, the next hop router of the router in the next AS to which the border router is in communication, and AS identifiers that describe the autonomous system of the next hop router and any other autonomous systems a communication having as its destination address, the address in the message, or an address in the block of addresses in the message, should pass through on its way to its intended destination from the home AS if it uses the path advertised in the message. Communications travel over links between each adjacent pair of nodes.

When large numbers of BGP messages are received and propagated as (I)BGP messages, they can slow down the processing of communications being forwarded by the routers, and the source of the messages may also be causing certain communications to be dropped. Identifying the source of the problem that caused the messages is made difficult due to the large number of such messages. It isn't unusual to have in excess of a million messages pertaining to a single problem. If multiple problems occur near each other in time, the task of identifying the source of the problems is made more difficult due to the fact that the messages resulting from all of the problems will be mixed together.

It can be desirable to allow a system administrator in one AS to identify one or more sources of BGP messages that may indicate an error or problem in either that same AS (the "home AS") or an error or problem in another AS. The identification of the node that is most likely the source of such errors can allow that system administrator to either correct the errors in the home AS, reroute the communications so that they avoid the problem AS, or to request corrective measures by the operator of another AS to avoid the performance problems that will result if the errors persist. It can also be helpful to view an animation of the actual result of the problem.

SUMMARY OF INVENTION

A system and method collects (I)BGP routing messages and receives from a system administrator a period of study. The system and method then counts, for each link defined between two nodes in the messages received during the period of study, the messages that address that link in their path. Beginning with the link with the highest number of messages received during the period of study, the system and method selects that link, identifies the times, if any, of events that occurred related to that link, segregates the messages that reported the selected link in their path, according to events that occurred for messages related to the selected link, and also segregates messages announcing a path that, though not containing that link, results from communications over the selected link, or its nodes, being interrupted or restored around the times of events identified for the selected link. The system and method attempts to correlate some or all of the events on the selected link, for example identifying a number of events as oscillations or pairing interruptions with restorations, if possible. Then, ignoring the previously segregated messages, the system and method repeats the process of selecting the link with the highest remaining number of messages, identifying events related to that link, segregating messages related to events that occurred on that link or its nodes, and attempting to correlate the events. The system and method can then display a report or an animation showing, for example, the addresses or blocks of addresses carried by a link over time during the period of study.

DETAILED DESCRIPTION OF A PREFERRED EMBODIMENT

Figure 1:
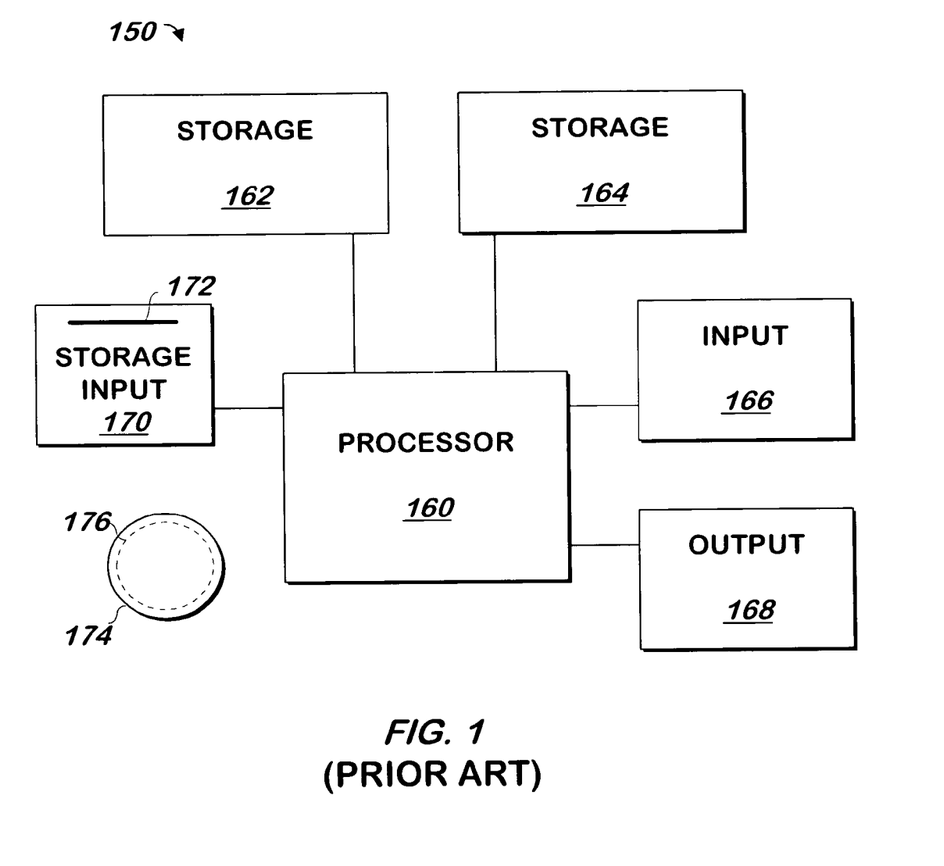
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the LINUX operating system or the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Overview of Network and System.

Figure 2:
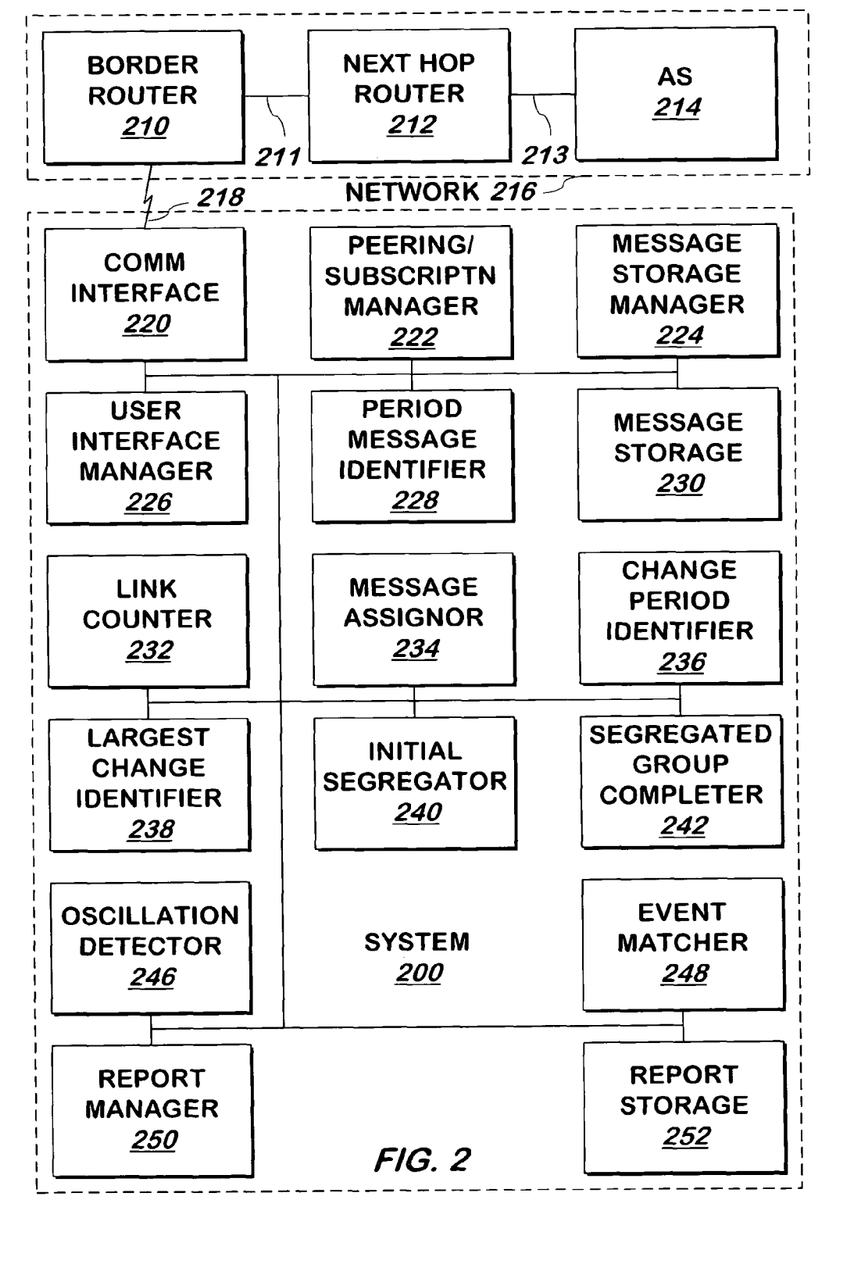
FIG. 2 is a block schematic diagram of a system for analyzing a network according to one embodiment of the present invention.

Referring now to FIG. 2, a system 200 for analyzing a network 216 is shown according to one embodiment of the present invention. Some representative nodes of the network 216 are shown across the top of the Figure. The representative nodes 210, 212, 214 of the network 216 shown in FIG. 2 include, in one embodiment, a border router 210 that is part of the home autonomous system to which the system is coupled, a next hop router 212 coupled to the border router 210 and a remainder of an autonomous system 214 of which next hop router 212 is a part. Links 211, 213 couple the routers 210, 212, and 214. Other nodes not shown in the network 216 may include other autonomous systems to which autonomous system 214 is directly or indirectly (e.g. via another autonomous system) coupled, and may include any number of other border routers, each coupled to one or more next hop routers, coupled to the remainder of an autonomous system, which are in turn coupled to other autonomous systems. Still other nodes not shown are the networks corresponding to the one or more addresses or blocks of addresses (referred to using a prefix) that correspond to a network of devices or a single device. Nodes may be coupled to more than one other node, for example, a next hop router other than next hop router 212 may be part of (and therefore coupled to) autonomous system 214. The present invention works in any network containing nodes representing any arbitrary portion of a network that are recognized by messages sent by the network as described in more detail below.

Communication Interface and User Interface Manager.

In one embodiment, all communication into or out of system 200 is made via input/output 218 of communication interface 220 which is coupled to network 216, which may include some or all of the Internet or a local area network or both. Communication interface 220 is a conventional communication interface that supports Ethernet, TCP/IP or other conventional communication protocols.

In one embodiment, a system administrator communicates with system 200 using a browser running on computer system (not shown) coupled to network 216. The user requests a web page using an IP address and port corresponding to user interface manager 226, and communication interface 220 receives such requests, and forwards them to user interface manager 226. User interface manager 226 provides a web user interface, receives information from the user via one or more web pages and provides responses to the user's computer system via communication interface 220 using conventional communication techniques.

Peering with Border Routers or Subscribing to Messages from Border Routers.

Upon system startup, in one embodiment, peering/subscription manager 222 peers with (I)BGP speaking routers, such as via a full mesh arrangement, to receive the (I)BGP messages from those routers using conventional techniques. In another embodiment, a system administrator supplies to user interface manager 226 one or more multicast addresses on which such (I)BGP messages are broadcast by the border routers in the home AS, such as border router 210 and user interface manager 226 supplies them to peering/subscription manager 222.

Peering/subscription manager 222 causes communication interface 220 to subscribe to those one or more multicast addresses. The peering or subscription process is arranged in a manner to cause communication interface 220 to supply all (I)BGP messages it receives to message storage manager 224.

Storage of Messages.

Message storage manager 224 receives all such (I)BGP messages, timestamps the messages by retrieving the current date and time at which the messages are received (from an operating system (not shown) or another timing device. Message storage manager 224 stores in message storage 230 the messages received as a message, containing the message received and the timestamp. Message storage 230 may include conventional memory or disk storage, and may include a conventional database.

Messages received may include announce messages announcing a route from a border router to an address or block of one or more contiguously numbered addresses, and the nodes in the network traversed between that border router and the address or block of addresses, or withdraw messages that indicate that the route to the address or block of addresses specified in the message is no longer valid. Although (I)BGP messages are the messages received as described herein, the system and method may employ other messages that provide the same or similar information.

The messages received identify the nodes in the path from the home AS from which the messages were collected to an address of block of addresses, starting from the border router of that AS, to the next hop border router in the adjacent AS, and continuing with AS identifiers in the node corresponding to the remainder of the AS containing the next hop router, and any other nodes corresponding to autonomous systems messages will transit in the path from the border router 210 to the node corresponding to the address or block of addresses corresponding to the message. The message also contains the address or blocks of addresses which can be reached via the path advertised.

Announce messages may include attributes or other information, such as conventional local preference information, MEDS, or community attributes supplied with conventional announce messages. In one embodiment, withdraw messages describing a block of addresses and the IP addresses of the routers at each end of the link corresponding to the path being withdrawn may be matched with the prior announce message for that block of addresses and those two routers, and the attributes from the announce message are treated as attributes for both such messages, for example by event matcher 248 storing them as part of the withdraw message in message storage 230.

In one embodiment, if a message contains more than a single entry for an address, or more than a single block of addresses, message storage manager 224 "copies" the timestamped message into multiple messages, but includes in each "copy" only a single address or block of addresses, so that each "copy" includes only one address or block of addresses, different from the other "copies" but all of the "copies" include all of the addresses or block of addresses in the original message. The "copies" are otherwise identical to the originally-received message. Message storage manager 224 stores these messages into message storage 230 instead of storing the originally received message.

In one embodiment, message storage manager 224 stores the timestamped messages formatted to include the border router and next hop router specified in the message as the first two nodes (in that order) in the set of other nodes specified in each message, so that those two nodes may be treated equally with the other nodes specified in the messages, and for ease of processing the sequence of nodes so arranged.

Although the receipt of (I)BGP messages from BGP speakers is described herein, the present invention may be used to analyze any form of message, such as (E)BGP messages (also known as BGP messages).

Display of the Number of Messages Received Over Time.

In one embodiment, as message storage manager 224 stores such messages or upon request from the system administrator via a user interface provided by user interface manager 226, user interface manager 226 counts the messages in message storage 230 and displays the number of messages received over time, using a bar graph, with the X axis representing recent, or other specified periods time, and the y axis representing the number of messages received in period of that time.

Defining the Period of Study.

The user may use a user interface provided by user interface manager 226 to define a period of study, either graphically or by entering it as a date and time.

In one embodiment, user interface manager 226 continuously or periodically monitors the messages received over time in message storage 230 and defines a period of study in response to sensing a large number of messages received in a short period of time relative to an average number of messages for a similarly sized period of time. User interface manager 226 defines the period of study as that period of time, or around that period of time. When user interface manager 226 receives or defines a period of study, user interface manager 226 stores the period of study and a unique identifier it assigns to the period of study into report storage 252 and signals period message identifier 228 with the period of study and the identifier. All information corresponding to that period of study will be stored in report storage 252 associated with the identifier.

Identifying the Messages in the Period of Study.

When signaled, period message identifier 228 identifies the messages stored in message storage 230 that were received during the period of study by examining their timestamps, and associating any message having a timestamp in the period of study with the identifier of the period of study. When period message identifier 228 has completed identifying all of the messages in the period of study, period message identifier 228 signals link counter 232 with the identifier of the period of study.

Counting the Messages Corresponding to Each Link.

When it receives the identifier of the period of study, link counter 232 builds a table of links described in each of the messages identified as being in the period of study it receives, and counts the number of times that link is mentioned as being in the path of any such message in the period of study. A link is defined by its two nodes, which are listed in each message in the order of traversal, so a link corresponds to, and is identified by, two nodes listed one after the other in any message. In one embodiment, node corresponding to border router 210 or next hop router 212 will be identified in a message by the IP address of such routers 210, 212 and a node corresponding to an autonomous system 214 will be identified in a message by the identifier of the autonomous system. As used herein, an autonomous system is a network of one or more routers under administrative control of a single entity.

When link counter 232 has completed counting the number of times each link is described in the messages in the period of study, link counter 232 then sorts such link counts, and then selects the link with the highest number of messages that has not already been selected for this purpose. Link counter 232 provides the identifier of the selected link, its link count, and the identifier of the period of study to message assignor 234.

Assigning the Messages to a Significant Group.

Message assignor 234 receives the identifier of the selected link and its link count, and the identifier of the period of study, stores this information in report storage 252, and assigns to a significant group from the messages identified as being received during the period of study, all messages containing the selected link, provided that the number of messages being assigned to the group is more than a threshold quantity, such as ten percent, of the total number of messages received during the period of study and not already assigned to a group. In one embodiment, period message identifier 228 counts the number of messages it identifies as being in the period of study, and provides it to link counter 232, which provides it to message assignor 234.

To calculate whether the number of messages being assigned to the group exceeds the threshold, message assignor 234 receives this count from link counter 232, divides the number of messages by the total number received in the period of study and compares the result to a threshold. In one embodiment, message assignor 234 retrieves the threshold from user interface manager 226, which supplies either a default threshold, or a threshold it received from the system administrator via a user interface it provided, and internally stored. If the link count does not exceed the threshold, message assignor 234 signals report manager 248, and otherwise, message assignor 234 marks the messages received during the period of study and reporting in their paths, the link message assignor 234 receives from link counter 232, with a unique identifier of the significant group that it assigns, and supplies the identifier of the significant group to change period identifier 236.

Identifying the Number of Addresses Supported Over Time by the Link Corresponding to the Selected Significant Group.

When it receives the identifier of the significant group, change period identifier 236 processes the messages corresponding to that significant group by identifying one or more sub-periods in time (a sub period is a portion of or all of the period of study) where the number of addresses or blocks carried by the autonomous systems represented by the adjacent pair of AS identifiers corresponding to the group significantly changes, such significance being configurable by the user. In one embodiment, change period identifier 236 performs this function as will now be described.

The messages in the significant group are sorted, if necessary, in order of their timestamps and the number of addresses or blocks of addresses carried by the link corresponding to the significant group is calculated as of the timestamp of each message in the significant group. Withdraw messages received for addresses having no prior-received announce messages are assumed to have been announced prior to the start of the significant group for the purpose of identifying the number of addresses or blocks of addresses. A window containing the number of addresses corresponding to the first "n" messages in the significant group is identified. In one embodiment n is 2048. The minimum and maximum counts of addresses are identified in the first window. Call them p_localmin represented by the tuple (x_localmin, y_localmin) and p_localmax, represented by the tuple (x_localmax, y_localmax), where the first number in the tuple represents the time at which the minimum or maximum occurred, and the second number in the tuple represents the number of addresses assigned to the link at that time. Two variables, p_lastmin and p_lastmax, are initialized to the values of p_localmin and p_local max, respectively.

The window is moved forward one point at a time. Each point corresponds to the number of addresses or block of addresses that can transit the link corresponding to the significant group after a message has been taken into account for that link. Each time the window is moved, the following processes are performed:

1. If either p_localmin or p_localmax gets pushed outside of the current window (based on the x coordinate and the coordinates of the window), and the start peak or start valley point has not been recorded, and abs(y_localmax−y_localmin)>a threshold, such as 10% of the total number of prefixes corresponding to the significant group, two points, start peak and start valley are recorded as the p_localmax and p_localmin, respectively 2. The latest point p_i (x_i, y_i) in the window (the one that just entered the window) is compared to y_localmin and y_localmax. If y_i>y_localmax, p_localmax is set equal to p_i. If y_i<y_localmin, p_localmin is set equal to p_i.

3. If either p_localmin or p_localmax gets pushed outside of the current window, the new p_localmin or p_localmax is identified from the points in the window.

4. If the approximate midpoint in the current window is p_localmin, and (y_lastmax−y_localmin)>T, then:
   a. If the start peak point has not been recorded, and x_lastmax<x_localmin, then p_lastmax is recorded.
   b. If the start peak point is not recorded, and x_localmax<x_localmin, then p_localmax is recorded.
   c. p_localmin is recorded. Let p_lastmin=p_lastmax=p_localmin.

5. If the midpoint in the current window is p_localmax, and (y_localmax−y_lastmin)>T, then:
   a. p_localmax is recorded. Let p_lastmin=p_lastmax=p_localmax.
   b. If the start valley point has not been recorded, and x_lastmin<x_localmax, then p_lastmin is recorded.
   c. If the start peak point is not recorded, and x_localmin<x_localmax, then p_localmin is recorded.
   d. p_localmin is recorded. Let p_lastmin=p_lastmax=p_localmax.

The window is thus processed until there are no more points that can enter the window. At that point, the following steps are performed:

1. If (y_localmax−y_lastmin)>T, record p_localmax.
2. If (y_lastmax>y_localmin)>T, record p_localmin.

If there are at least two recorded points, then a significant change has occurred between each adjacent pair of recorded points. The time between each pair of adjacent recorded points (e.g. recorded point 1 and recorded point 2, and between recorded point 3 and recorded point 4) is considered to be a sub period of the period of study. Change period identifier 236 stores in report storage 252 associated by the significant group identifier, the timestamps of the messages corresponding to the first and last points of each such pair of recorded points, as well as the difference between the highest number of addresses or blocks of addresses at any of the recorded points in that sub period and the lowest number of addresses or blocks of addresses at any of the recorded points, and an identifier of the sub period, unique to other sub periods corresponding to the significant group.

In another embodiment, the topics discussed in Keogh, E., Chu, S., Hart, D. & Pazzani, M. (2001). An Online Algorithm for Segmenting Time Series, In Proceedings of IEEE International Conference on Data Mining. pp. 289-296 may be used to identify the sub periods.

When change period identifier 236 has completed identifying all of the sub periods as described above, change period identifier 236 signals largest change identifier 238 with the identifier of the significant group. If no sub periods were identified at all for the significant group, change period identifier 236 signals link counter 232, which operates as described below.

Identifying the Unselected Sub Period with the Largest Change in Number of Addresses.

When it receives the identifier of the significant group, using the number of addresses changed for each sub period that are stored in report storage 252, largest change identifier 238 identifies the sub period for that significant group having a change in number of addresses that is the largest for the other sub periods for that significant group not already identified and provides the identifier of the significant group and the sub period to initial segregator 240. If no additional sub periods not already identified by largest change identifier 238 remain for the significant group, largest change identifier 238 signals oscillation detector 246 with the identifier of the significant group, described below.

Segregate the Messages, as Well as Additional Messages

When it receives the identifier of the significant group and sub period, initial segregator 240 scans the messages in message storage 230 and associates those in the significant group that are not already associated with a sub period (or marked as explained as described below) with the identifier of the sub period if the date and time of receipt of the message is in the sub period, including the edges of that sub period, corresponding to the sub period identifier it receives. Initial segregator 240 marks each such message in message storage 230 as "explained", so that it is removed from further analysis other than reporting as described below.

As it associates and marks each such message, initial segregator 240 extracts the address or block of addresses of each message it associates and marks as described above, and adds the address or block of addresses corresponding to the message to a list of such addresses for such sub period, if the address or block of addresses is not already on the list for that sub period, and stores in report storage 252, associated with the identifier of the sub period and significant group, the list of such addresses or blocks of addresses. When initial segregator 240 has completed associating and marking the messages and building the list, initial segregator 240 signals segregated group completer 242 with the identifiers of the segregated group and the sub period.

Complete the Segregation

When signaled with the significant group identifier and the sub period identifier, segregated group completer 242 retrieves the starting and ending times of the sub period, retrieves in report storage 252 the list of addresses for the significant group identifier and sub period identifier, and locates messages in message storage 230 not in the significant group and not marked as explained, associates them with the identifiers of the significant group and sub period and marks them as explained for any such message that has a date and time of receipt that is in, or a configurable amount of time shortly after, the sub period, and has an address or block of addresses that matches one of the addresses or blocks of addresses in the list of addresses for the significant group and sub period segregated group completer 242 retrieves.

The configurable amount of time may be an amount of time equal to the BGP reporting period in which messages announcing reroutes caused by the changed number of addresses would be expected. In one embodiment, segregated group completer 242 retrieves the configurable amount of time from user interface manager 226. User interface manager 226 supplies a time provided by the system administrator via a user interface provided by user interface manager 226, or if no such time has been provided, user interface manager 226 supplies segregated group completer 242 with a default amount of time.

When segregated group completer 242 completes adding any messages to the significant group and sub period, segregated group completer 242 signals largest change identifier 238 with the identifier of the significant group.

Select the Sub Period with the Next Highest Number of Addresses and Repeat the Process.

When signaled, largest change identifier 238 repeats the process as described above or signals oscillation detector 246 as described above.

Check for Oscillations.

When it receives the identifier of the significant group, oscillation detector 246 scans the tables of addresses and cumulates the amount of time between the starting and ending times in each of the sub periods for which most (or another threshold amount) of the addresses or blocks of addresses in the list of addresses for the sub period are the same. Oscillation detector 246 then looks up the period of study corresponding to the identifier of the significant group it receives, and if the cumulated times are more than a threshold portion of the amount of time in the period of study, oscillation detector 246 indicates that the significant group corresponds to an oscillation, and marks the identifiers of the sub periods as being a part of the oscillation. When oscillation detector 246 has completed determining whether an oscillation has occurred as described above, oscillation detector 246 signals event matcher 248 with the identifier of the significant group.

Check for Matched Sub Periods.

When signaled with the identifier of the significant group, event matcher 248 scans the list of addresses or blocks of addresses corresponding to the sub periods in the significant group not marked as being a part of an oscillation, and attempts to correlate the messages between different sub periods in the same significant group.

In one embodiment, when change period identifier 236 identifies the sub periods as described above, it stores in report storage 252 associated with the sub period identifier whether the number of addresses carried by the link corresponding to the significant group increased or decreased during the sub period. To correlate sub periods, event matcher 248 selects the first sub period not marked as being a part of an oscillation and compares its list of addresses or blocks of addresses with the list of addresses or blocks of addresses in a subsequent sub period that had the opposite effect on the number of addresses than the selected sub period (e.g. if the number of addresses increased in the selected sub period, event matcher 248 compares the list to those sub periods that had a decrease in number of addresses). If a threshold number of addresses or blocks of addresses are common to both lists, event matcher 248 marks the sub periods as correlated with one another and assigns a correlation identifier to each of them that can be used to locate them again. If not, event matcher 248 compares the address list of the selected sub period with that of another sub period with an opposite effect on the number of addresses, and repeats this process until it locates another such correlated sub group or there are no additional sub groups, in which case, event matcher 248 selects the next uncorrelated sub period and repeats the process with those sub periods that follow it. In one embodiment, event matcher 248 only uses sub periods with an increasing (or decreasing) number of addresses as the selected sub period, with which to start the comparison.

Link Counter Starts Again Using Unexplained Links During the Period of Study.

When link counter 232 is signaled as described above, link counter repeats the counting of links and then reinitiates the remainder of the process described above. However, when link counter 232 repeats the counting of links, and the other elements process the messages as described above, messages marked as explained are ignored. Thus, the system only considers the remaining messages in its analysis. Reporting, described below, is performed for all messages, without ignoring those marked as explained.

In one embodiment, link counter 232 only counts links a particular number of times per period of study. When link counter 232 is signaled, but has already located that number of links for the period of study, link counter 232 signals report manager 250.

Reports.

When signaled, report manager 250 displays via communication interface 220 to the system administrator's computer system information about the sub periods, each of which may correspond to an event; such as a failure of a link or a node, using the information in report storage 252 and message storage 230 described above.

In one embodiment, report manager 250 displays, for each such sub period, a text description of the sub period including the AS identifier of the first AS identifier in the pair of adjacent AS identifiers that correspond to the significant group corresponding to the sub period, the beginning date and time corresponding to the sub period and the number of addresses or blocks of addresses in the list of blocks of addresses in the sub period. Report manager 250 may optionally display with each such description, identifiers of the autonomous systems that had the offsetting increase or decrease in addresses assigned, by listing the node identifiers of the messages that were added to the sub period corresponding to the description. The user is allowed to select one such description, and request an animation containing a map of the relevant autonomous systems as nodes in the network with links between them illustrating the changes in addresses or blocks of addresses assigned to the autonomous systems at both ends of the links. (Instead of a description for each sub period, report manager 250 may display a description for the entire significant group).

Report manager 250 then animates the portion of the network related to the withdraw and announce messages in the sub period corresponding to the selected description, or all of the sub periods corresponding to the significant group containing the selected sub period, by displaying an animation of a map of the network that, over time, shows the change in numbers of addresses announced and withdrawn for links between autonomous systems as described above. The animation period may encompass the starting and ending times of the sub period corresponding to the selection made by the user, an animation period corresponding to all of the sub periods corresponding to the same significant group as the selected sub period or another animation period selected by the user. Report manager 250 displays each AS or other node to which addresses were announced, or from which they were withdrawn, in messages in the sub period or significant group being animated, with each AS or other node displayed as a node on the map, such node being represented by an oval containing the AS identifier or other node identifier, with lines between the nodes corresponding to the order of each AS in the announcement and withdraw messages, and the number of addresses or blocks of addresses carried by the link represented by the line being displayed next to it. The thickness of the line is displayed by report manager 250 proportional to the number of blocks or addresses that are indicated by the announce and withdraw messages as using the link corresponding to that line. Report manager 250 may truncate from the display any nodes and/or links for which announcement and withdraw messages do not result in a configurable minimum number, or percent of the total number, of addresses or blocks of addresses in the significant group corresponding to the animation. Thus, in the animated display, over time, lines corresponding to links having more addresses withdrawn than announced will get thinner, and lines corresponding to links having more addresses announced than withdrawn will get thicker.

Report manager 250 may also display a bar graph showing the number of addresses announced as being supported by the link between the pair of AS identifiers corresponding to the significant group from which the sub period was selected, with the X axis representing time, and the y axis representing the number of addresses or blocks assigned to that link. During the animation, report manager 250 moves a vertical line on this graph from left to right as the animation progresses to identify the point in time that the animated network map represents.

In addition to the display of the descriptions of the sub periods or significant groups, report manager 250 may display text descriptions of each of the significant groups or sub periods identified as having oscillating members or being part of an oscillation as described above. These text descriptions may include the addresses or blocks of addresses in all of the messages in the sub groups identified as oscillating, as well as the date and time the first message in the group was received, and identifiers of the autonomous systems that are contained as attributes in the messages in that group. In one embodiment, identifiers of autonomous systems common to all messages in the group (or common to all messages for a particular address or block of addresses in the group) are not displayed, so that only the autonomous systems in the oscillating part of the path are displayed by the system and method as part of these text descriptions. In one embodiment, the average period of oscillation for the blocks of addresses in each oscillation group may also be displayed as part of the text descriptions.

Descriptions of correlated (i.e. matched) sub periods may also be displayed by report manager 250. For example, during the display related to one sub period, a text description stating the effect of the routing change on any AS affected by the routing change for that sub period would be displayed by report manager 250.

Figure 3:
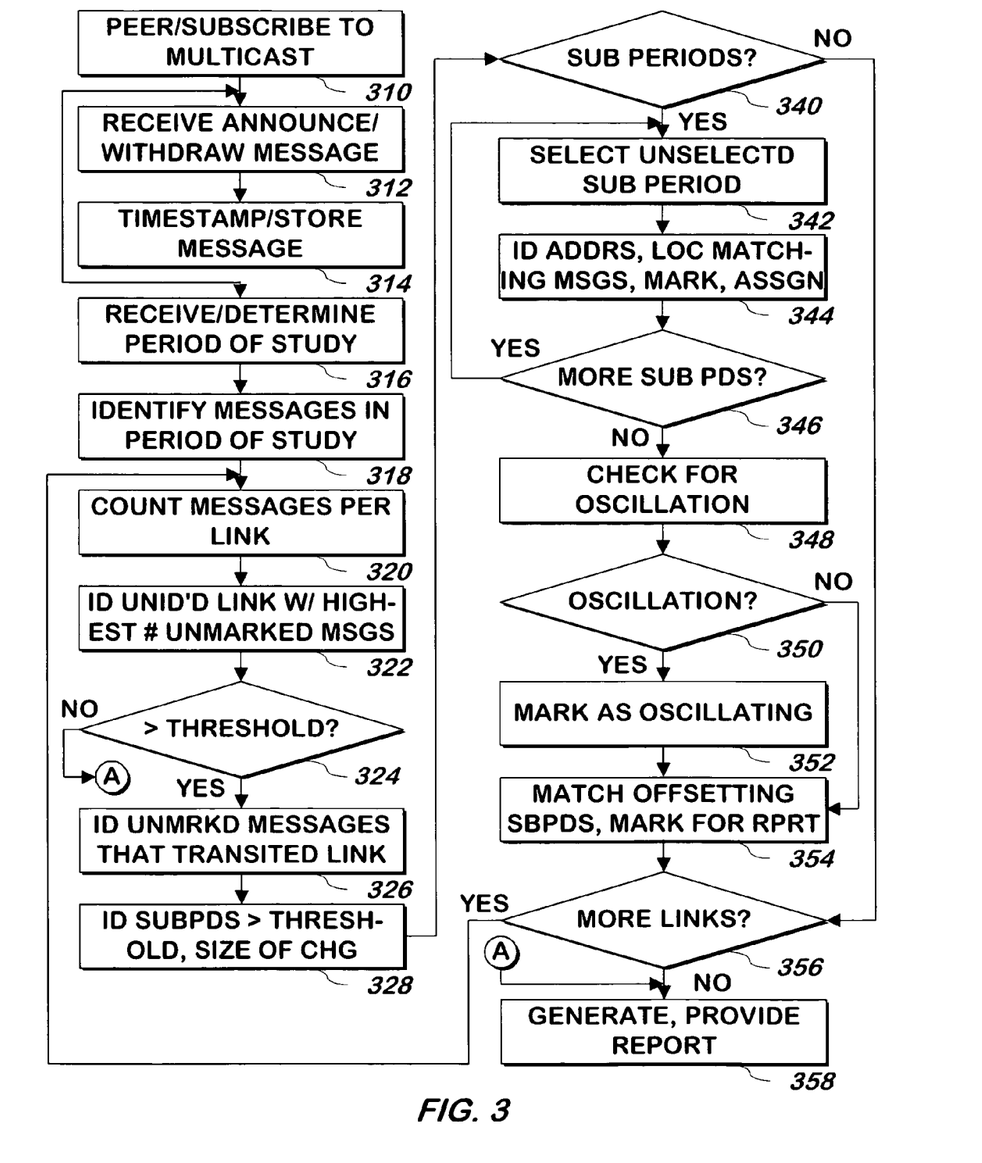
FIG. 3 is a flowchart illustrating a method of analyzing a network according to one embodiment of the present invention.

Referring now to FIG. 3, a method of analyzing a network is shown according to one embodiment of the present invention. A peering is performed with one or more routers, or a multicast is subscribed to, or another manner of arranging to receive messages such as (I)BGP messages, (E)BGP messages (also known as BGP messages) is performed 310. Messages such as receive messages, announce messages or other types of messages are received 312, timestamped and stored 314 as described above and the method continues at step 312. Some or all of the remaining steps in the method employ the messages stored in step 314, and so a dotted line appears from step 314 to 316, but steps 316-358 may be part of a separately running process from steps 310-314.

A period of study is received or determined 316 as described above and messages received during the period of study are identified 318. Step 316 may include splitting and/or reformatting the information in the message to include a unified path from the border router to the address or block of addresses. For each link corresponding to the messages identified in step 318, the number of messages that refers to that link are counted 320.

The link with the greatest number of messages counted in step 320 that has not already be identified is identified 322. Optionally, if the number of messages for the identified link exceeds a threshold 324, the method continues at step 326 and otherwise 324, the method continues at step 358. In another embodiment, step 324 is not performed and step 326 follows step 322 unconditionally. Messages identified in step 318 that transited the link identified in step 322 are identified if they are not already marked as explained 326. Sub periods corresponding to changes larger than a threshold are identified 328, along with the size of the change and whether the sub period resulted in more or fewer addresses assigned to the link identified in step 322.

If there were no sub periods identified, the method continues at step 356, described below, and otherwise, a sub period not already selected is selected, such as the earliest sub period of those identified in step 328 or the one with the largest change. The addresses or blocks of addresses for the selected sub period are selected and messages having those addresses received at or around the time of the sub period are identified as being associated with the sub period, as are those messages transiting the link identified in step 326 during the sub period. If there are more sub periods 346 identified in step 328 but not selected in step 342, the method continues at step 342 and otherwise, the method continues at step 348.

At step 348, a check is made to see if the messages corresponding to the link identified in step 322 received during the sub periods identified in step 328 correspond to an oscillation. If so, the sub periods, link, or both are marked as oscillating 352 and any offsetting sub periods are matched as described above 354. Any or all of the Information described above may be stored for the report of step 358.

If there are more links 356, or more links meeting a certain criteria, such as a maximum number of links to be identified and processed as described above, the method continues at step 320 and otherwise 356, the a report is generated and provided to the system administrator as described above 358.

What is claimed is:
1. A method of identifying issues in a network, comprising:
 a) receiving a plurality of messages, each of the plurality of messages describing at least one link in the network;
 b) storing each of the plurality of messages;
 c) for each link corresponding to at least some of the plurality of messages received, counting the number of messages received that describe said link and are not identified as explained;

d) identifying a link with the highest number of messages per link and that are not identified as explained;
e) for each message describing the link identified:
  i) assigning the message to a group; and
  ii) identifying the message as explained;
repeating steps d and e, including e (i) and e (ii) at least once, using the messages not identified as explained; and
f) displaying a report responsive to steps d and e, including e (i) and e (ii).

2. The method of claim 1, wherein at least some of steps c, d and e are responsive to a number of messages received during a period of time exceeding threshold.

3. The method of claim 2 wherein the threshold is identified relative to an average number of messages received during a similar length period of time.

4. The method of claim 1, wherein step e is responsive to the number of messages for the link identified in step d being higher than a threshold.

5. The method of claim 1, wherein the messages received at step a comprise messages about traffic carried through a plurality of autonomous systems.

6. The method of claim 1, wherein the messages received at step a comprise announce messages and withdraw messages.

7. The method of claim 1: additionally comprising:
  g) identifying at least a subset of the messages assigned to at least one group as corresponding to an oscillation responsive to addresses of the at least the subset of the messages; and
  wherein the report is responsive to step g.

8. A computer program product comprising a non-transitory computer useable medium having computer readable program code embodied therein for identifying issues in a network, the computer program product comprising computer readable program code configured to cause a computer system to:
  a) receive a plurality of messages, each of the plurality of messages describing at least one link in the network;
  b) store each of the plurality of messages;
  c) for each link corresponding to at least some of the plurality of messages received, count the number of messages received that describe said link and are not identified as explained;
  d) identify a link with the highest number of messages per link and that are not identified as explained;
  e) for each message describing the link identified:
    i) assign the message to a group; and
    ii) identify the message as explained;
repeating operation of computer readable program code d and e, including e (i) and e (ii) at least once using the messages not identified as explained; and
  f) display a report responsive to the computer readable program code d and e, including e (i) and e(ii).

9. The computer program product of claim 8, wherein at least some of computer readable program code c, d and e are responsive to a number of messages received during a period of time exceeding a threshold.

10. The computer program product of claim 9 wherein the threshold is identified relative to an average number of messages received during a similar length period of time.

11. The computer program product of claim 8, wherein computer readable program code e is responsive to the number of messages for the link identified in step d being higher than a threshold.

12. The computer program product of claim 8, wherein the messages received by computer readable code a comprise messages about traffic carried through a plurality of autonomous systems.

13. The computer program product of claim 8, wherein the messages received by computer readable program code a comprise announce messages and withdraw messages.

14. The computer program product of claim 8: additionally comprising computer readable program code configured to cause the computer system to:
  g) identify at least a subset of the messages assigned to at least one group as corresponding to an oscillation responsive to addresses of the at least the subset of the messages; and wherein the report is responsive to computer readable program code g.

15. A system for identifying issues in a computer network, wherein the system comprises:
  a non-transitory computer useable medium having computer readable program code embodied therein for identifying issues in the computer network, the computer readable program code:
  a) receiving a plurality of messages, each of the plurality of messages describing at least one link in the computer network;
  b) storing each of the plurality of messages;
  c) for each link corresponding to at least some of the plurality of messages received, counting the number of messages received that describe said link and are not identified as explained;
  d) identifying a link with the highest number of messages per link and that are not identified as explained;
  e) for each message describing the link identified:
    i) assigning the message to a group; and
    ii) identifying the message as explained;
  f) repeating d and e, including e (i) and e (ii) at least once using the messages not identified as explained; and
  g) displaying a report responsive to the computer readable program code d and e, including e (i) and e(ii).

* * * * *